United States Patent Office 3,375,444
Patented Mar. 26, 1968

3,375,444

VESTIGIAL SIDEBAND MODULATOR CIRCUIT

Geoffrey John Lomer, Ickenham, Uxbridge, England, assignor to Electric & Musical Industries Limited, Hayes, England, a British company Filed Nov. 21, 1963, Ser. No. 325,353
Claims priority, application Great Britain, Nov. 30, 1962, 45,341/62
3 Claims. (Cl. 325—136)

This invention relates to the generation of an amplitude modulated carrier wave having a vestigial sideband. It relates especially though not exclusively to television transmitters.

Figure 1A:
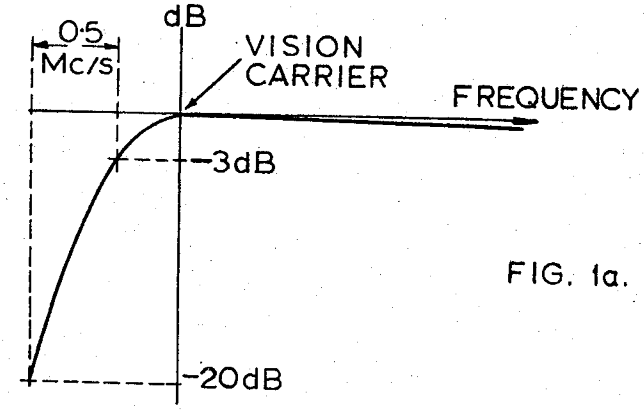
Figure 1B:
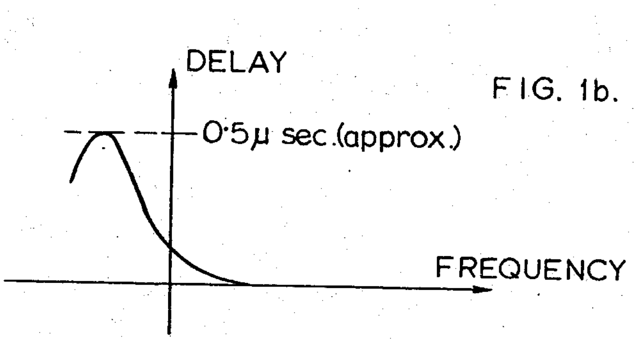

It is now usual to transmit television signals on a carrier wave in such a way that the components of one sideband (usually the lower sideband) corresponding to higher frequency video components are suppressed leaving only the components of that sideband, corresponding to the lower video frequency components. These retained components constitute a vestigial sideband. The filter used to produce the vestigial sideband may, for example, be required to have an attenuation which increases from 3 db to 20 db while the frequency changes only by 0.5 mc./s. Such an attenuation is represented by the attenuation/frequency characteristic shown in FIGURE 1*a* of the accompanying drawing. However a filter capable of giving such a steep attenuation characteristic inevitably produces serious delay in the frequency range where the attenuation characteristic is steep, and such delay, represented as a function of frequency, may be as represented in FIGURE 1*b*. The frequency conscious delay is in turn found to produce errors in the pulse response of the transmitter.

Figure 2A:
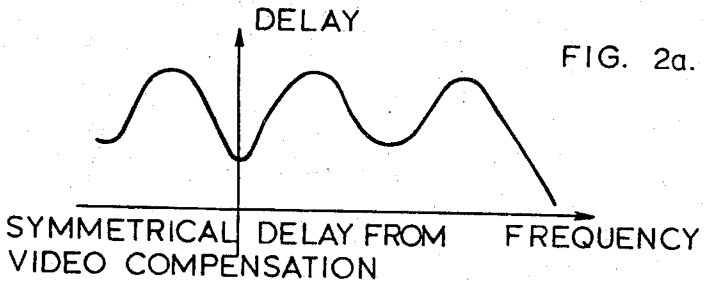
Figure 2B:
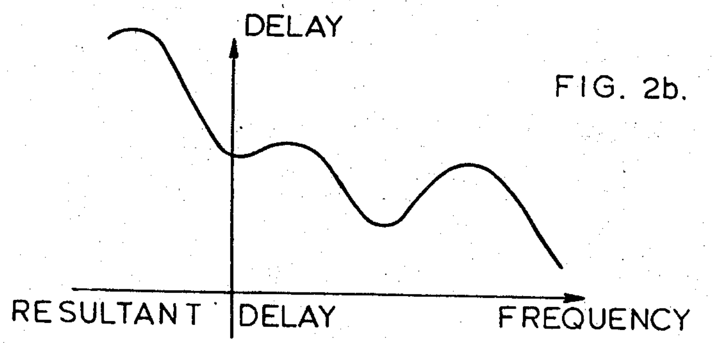

To reduce this undesirable effect it has been proposed to produce some frequency conscious delay in the video signal before it is caused to modulate the carrier wave. However, such delay will appear as a delay of the modulated carrier wave which is symmetrical about the carrier frequency and since the delay characteristic of FIGURE 1*b* is asymmetrical about the carrier frequency, exact delay equalisation by the combined effect of the two delays is not possible. Nevertheless some improvement in the pulse response can be produced. FIGURE 2*a* represents the kind of symmetrical delay of the modulated carrier wave which may result from frequency conscious delay of the video signal, the video compensation being represented by the portion of the delay characteristic to the right of the vertical line which represents the carrier frequency. FIGURE 2*b* represents the combined effect of the two delays shown in FIGURES 1*b* and 2*a*, and it can be seen that the delay is still not constant or nearly constant over the transmission band.

Similar difficulties may occur in other cases in which it is desired to generate an amplitude modulated carrier wave having one side partially removed and the object of the present invention is to provide more exact delay equalisation than can be achieved by the method represented in FIGURES 2*a* and 2*b*.

According to the invention, compensatory delay of the modulating signal is confined substantially to frequency components which are transmitted single sideband, and compensatory delay of other frequencies is effected as delay after the modulating signal has been caused to modulate a carrier wave.

The present invention takes advantage of the fact that delay which is asymmetrical about the carrier frequency can be effected after the modulation of the carrier wave, and therefore it is possible by such delay to compensate for asymmetrical delay such as represented by FIGURE 1*b*. It might be thought that equalisation of delay for the whole sideband spectrum could be achieved by delay after modulation but complete equalisation after modulation would require many sections of all-pass network each of which would be difficult to achieve in practice and also difficult to set up and maintain set up. Also, it would be difficult to provide suitable delay networks having sufficiently high Q factors and reactance ratios. By virtue of the invention the delay over most of the frequency spectrum is achieved by delaying the video signal, which is practically relatively simple, and the delay which is effected after modulation is required over only a restricted frequency range and so can be achieved by a single or at most a few all-pass sections.

Figure 6:
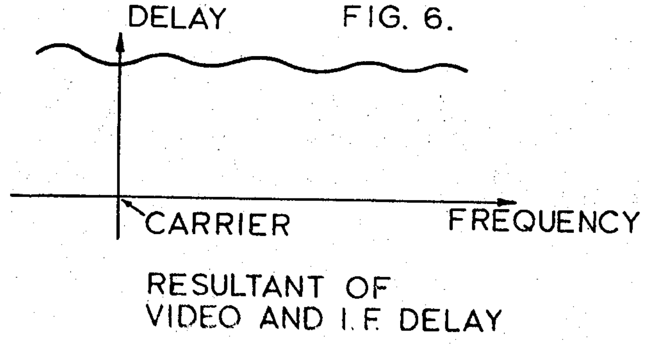
Figure 7:
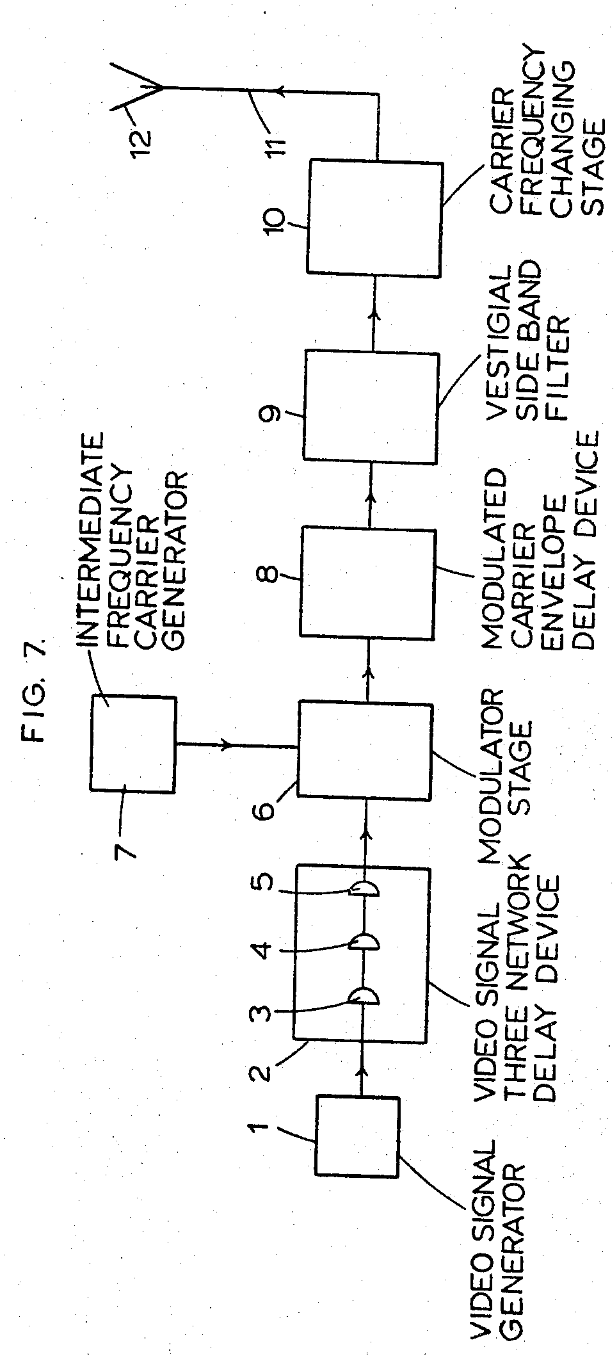

In order that the present invention may be clearly understood and readily carried into effect, it will now be more fully described with reference to the accompanying drawings, in which:

FIGURES 3 to 6 are explanatory of the operation of a television transmitter according to one example of the present invention, and FIGURE 7 illustrates in block form one example of a television transmitter according to the present invention.

The example of the invention which is illustrated in FIGURE 7 is embodied in a transmitter in which the video signal is caused to modulate an intermediate frequency carrier wave, the resultant modulated carrier wave is then transposed to the broadcast frequency. This form of transmitter has the advantage that a standard construction can be used for transmitters having different broadcast frequencies, only the stage in which the frequency transposition occurs being required to differ from one transmitter to the other.

Figure 3:
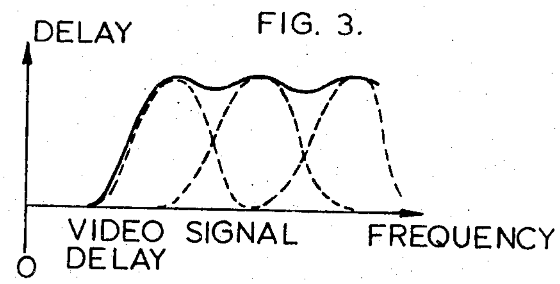
Figure 4:
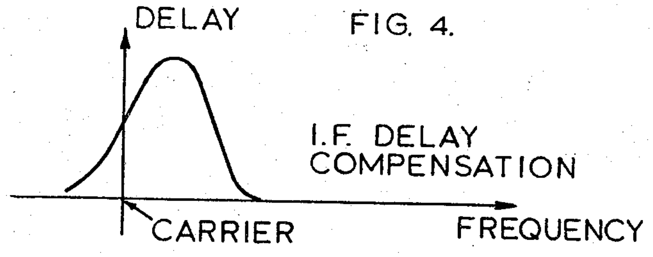
Figure 5:
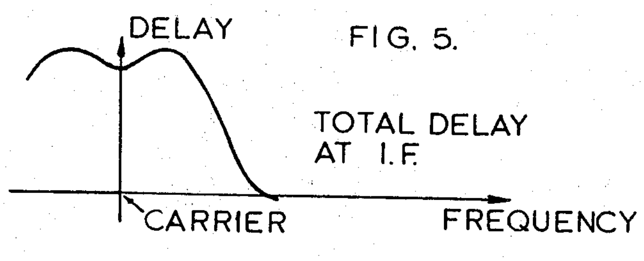

As shown in FIGURE 7 a transmitter comprises a video signal generator 1 which applies a video signal, which may be a colour signal, to the input of a delay device 2 having three individual delay networks indicated by the references 3, 4 and 5 respectively and having respective delay frequencies characteristics such as indicated by the dotted lines in FIGURE 3. The delay device 2 imposes therefore an overall frequency dependent delay on the video signal as represented graphically by the full line in FIGURE 3. A carrier oscillation of intermediate frequency is provided by the generator 7. The intermediate frequency carrier oscillation is amplitude modulated in response to the delayed video signal output of the delay device 2 in a modulator stage 6. The modulated carrier wave is then applied to a further delay device 8 which imposes a frequency dependent delay compensation such as illustrated in FIGURE 4. This delay is achieved by an all-pass network. It will be noted that this delay is asymmetrical with respect to the intermediate frequency carrier wave. The output signal from the delay device 8 is applied to a vestigial sideband filter 9 having a frequency characteristic as indicated graphically in FIGURE 1*a* and which imposes a further asymmetrical delay as indicated in FIGURE 1*b*. The overall delay imposed on the intermediate frequency signal by the combined effect of the delay device 8 and the vestigial sideband filter 9 is indicated graphically in FIGURE 5. This signal is changed to an appropriate frequency for transmission in a frequency changing stage 10 and then is applied, via a suitable feeder 11, to an aerial array, which is indicated in FIGURE 7 by the reference 12. The delay device 8 may be placed after the vestigial sideband filter instead of before it if desired. Indeed, delay equivalent to that produced by the device 8 may be produced at any convenient point after the first modulator stage. As can be seen in FIGURE 6 the resultant of the delays produced by the filter 9, and by the delay devices whose characteristics are represented by FIGURES 3 and 4, is a substantially equal delay over all the frequency spectrum of the intermediate frequency carrier wave and sidebands, after vestigial sideband filtering. The delay of the video signal does not appreciably effect thet vestigial sideband of the intermediate frequency carrier wave, since any sideband components which would be affected are substantially suppressed by the filtering.

The constructions of the delay devices 2 and 8 and of the filter 9 have not been represented in the drawing, since such constructions may be of well known kind, depending on the frequencies and frequency ranges involved. Similarly, the other components shown in block form may be of well known construction.

The invention is also applicable to transmitters in which the video signal modulates the broadcast carrier wave directly. The invention may moreover be applied to vestigial sideband transmitters other than for television.

What I claim is:

1. Apparatus for generating an amplitude modulated carrier wave having a vestigial sideband, comprising a source of modulating signal, means for delaying frequency components of the modulating signal which are transmitted single sideband relative to components of the modulating signal which are transmitted double sideband a source of carrier wave, means for modulating the amplitude of the carrier wave with the modulating signal after said delay has been effected, means for delaying selected frequency components of the modulated carrier wave, said selected components at least including components which have a counterpart in the vestigial sideband and means for partially removing one sideband of the modulated carrier wave to form the vestigial sideband, the delays of said frequency components of the modulating signal and of the carrier wave being arranged to substantially reduce the relative delay which would otherwise be produced by the partial removal of said one sideband.

2. Apparatus according to claim 1 wherein said carrier wave is an intermediate frequency wave and comprising frequency changing means for changing the frequency of said carrier before transmission.

3. Apparatus according to claim 1 wherein the modulated carrier wave is applied to said means for delaying selected frequency components before being applied to means for forming the vestigial sideband.

References Cited

UNITED STATES PATENTS

| | | | |
|---|---|---|---|
| 2,285,085 | 6/1942 | Hagen | 325—65 |
| 2,986,597 | 5/1961 | Teer | 178—5.2 |
| 3,084,327 | 4/1963 | Cutler | 325—46 |
| 3,244,807 | 4/1966 | Richman | 325—136 |

JOHN W. CALDWELL, *Primary Examiner.*